United States Patent
Garg et al.

(10) Patent No.: US 11,436,236 B2
(45) Date of Patent: Sep. 6, 2022

(54) COMMAND-LINE SCRIPT GENERATION WITH RELEVANCE SEARCH

(71) Applicant: MICROSOFT TECHNOLOGY LICENSING, LLC., Redmond, WA (US)

(72) Inventors: Spandan Garg, Calgary (CA); Yevhen Mohylevskyy, Redmond, WA (US); Jason R. Shaver, Redmond, WA (US); Neelakantan Sundaresan, Bellevue, WA (US); Roshanak Zilouchian Moghaddam, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 301 days.

(21) Appl. No.: 16/865,252

(22) Filed: May 1, 2020

(65) Prior Publication Data
US 2021/0342357 A1 Nov. 4, 2021

(51) Int. Cl.
*G06F 16/2457* (2019.01)
*G06F 16/242* (2019.01)
*G06K 9/62* (2022.01)
*G06F 9/455* (2018.01)
*G06F 8/30* (2018.01)

(52) U.S. Cl.
CPC .......... *G06F 16/24578* (2019.01); *G06F 8/30* (2013.01); *G06F 9/45512* (2013.01); *G06F 16/243* (2019.01); *G06K 9/6215* (2013.01)

(58) Field of Classification Search
CPC .... G06F 16/243; G06F 16/24578; G06F 8/30; G06F 8/31; G06F 9/45512; G06K 9/6215
See application file for complete search history.

(56) References Cited

U.S. PATENT DOCUMENTS

2008/0201298 A1* 8/2008 Grinspan ............ G06F 9/45512

OTHER PUBLICATIONS

Akbar, et al., "SCOR: Source Code Retrieval With Semantics and Order", In Proceedings of the IEEE/ACM 16th International Conference on Mining Software Repositories (MSR), May 25, 2019, 12 Pages.
Bengio, et al., "A Neural Probabilistic Language Model", In Journal of Machine Learning Research, vol. 3, Feb. 2003, pp. 1137-1155.
Gu, et al., "Deep Code Search", In Proceedings of the IEEE/ACM 40th International Conference on Software Engineering (ICSE), May 27, 2018, pp. 933-944.

(Continued)

*Primary Examiner* — Etienne P Leroux (57) ABSTRACT

A term-weighting and document-scoring function is used to search for a command line interface (CLI) script that is likely relevant to an operation specified in a natural language query. CLI scripts are created to perform various operations of a CLI-based application. A CLI script is associated with a description document having keywords associated with the individual commands used in the CLI script. The relevance of a CLI script to an intended operation is based on the term-weighting and document-scoring function which is applied to each component of each command in a CLI script and weighted accordingly.

20 Claims, 7 Drawing Sheets

(56) References Cited

OTHER PUBLICATIONS

Joulin, et al., "Bag of Tricks for Efficient Text Classification", In Proceedings of the 15th Conference of the European Chapter of the Association for Computational Linguistics: vol. 2, Short Papers, Apr. 3, 2017, pp. 427-431.

Lam, et al., "Bug Localization with Combination of Deep Learning and Information Retrieval", In Proceedings of the IEEE/ACM 25th International Conference on Program Comprehension (ICPC), May 22, 2017, pp. 218-229.

Lukins, et al., "Source Code Retrieval for Bug Localization Using Latent Dirichlet Allocation", In Proceedings of the 15th Working Conference on Reverse Engineering, Oct. 15, 2008, pp. 155-164.

Marcus, et al., "An Information Retrieval Approach to Concept Location in Source Code", In Proceedings of the 11th Working Conference on Reverse Engineering, Nov. 8, 2004, pp. 214-223.

Mikolov, et al., "Distributed Representations of Words and Phrases and their Compositionality", In Journal of Advances In Neural Information Processing Systems, Dec. 5, 2013, pp. 3111-3119.

Rao, et al., "Retrieval from Software Libraries for Bug Localization: A Comparative Study of Generic and Composite Text Models", In Proceedings of the 8th Working Conference on Mining Software Repositories, May 21, 2011, pp. 43-52.

Sachdev, et al., "Retrieval on Source Code: A Neural Code Search", In Proceedings of the 2nd ACM SIGPLAN International Workshop on Machine Learning and Programming Languages, Jun. 18, 2018, pp. 31-41.

Wang, et al., "Compositional Vector Space Models for Improved Bug Localization", In Proceedings of the IEEE International Conference on Software Maintenance and Evolution, Sep. 29, 2014, pp. 171-180.

* cited by examiner

COMMAND-LINE SCRIPT GENERATION WITH RELEVANCE SEARCH

BACKGROUND

A command line interface (CLI) is an application in which a user enters commands of a CLI-based application in the form of a string of text characters. The command line interface is a text-based interface in which the commands are manually typed. The command line interface accepts commands in a designated input field which are then executed by a command line interpreter. This type of user interface is advantageous over a graphical user interface (GUI) where a user uses a mouse or fingers to click images of icons to access files or programs and/or to execute various operations. The command line interface is faster and more efficient than a GUI since it is composable, that is, several tasks can be specified in a single text string thereby eliminating numerous interactions with the GUI.

The use of a command line interface requires a user to be familiar with the commands supported by the CLI-based application and the correct syntax of the commands Often, there are a large number of commands with each command having various parameters and parameter values. The availability of good reference documentation for the commands may be limited or outdated as the syntax of the commands changes dynamically. The lack of up-to-date documentation and examples impacts the usefulness of the command line interface.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A script query service generates scripts for a CLI-based application and searches for scripts that are relevant to a natural language query. The scripts contain an ordered sequence of CLI commands that perform an operation in the CLI-based application. The scripts are generated from telemetry data of production runs of the CLI-based application. The telemetry data is analyzed to determine the ordered sequence of commands used to execute a particular operation. A description document is generated for each script that contains keywords or terms that describe each command used in a script. The terms in the description document are extracted from documentation on the CLI commands.

The CLI command structure associates a command with a command group of a module. A module represents a service of the CLI-based application that performs certain operations on resources. The command group includes other commands from the same module. The script query service searches for CLI scripts that have been used to perform an intended operation based on a relevance score that uses terms in a query and terms in documents describing the command and its related command group and module. The relevance score is generated for each command in a CLI script and its related command group and module in order to estimate the relevance of a CLI script to a query. Weights are applied to certain components of a command, such as the command, command group or module, and the resulting score of the CLI script is the weighted sum of all the relevance scores. A threshold number of the highest-scoring CLI scripts are then returned.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Aspects of the present invention pertain to an information retrieval technique that searches for CLI scripts that are relevant to a natural language query. A CLI script is an ordered sequence of one or more commands that perform a particular operation in a CLI-based application. The ordered sequence of commands needed to perform an intended operation is derived from telemetry data generated from production runs of the CLI-based application. Each CLI script is associated with a description document containing a set of keywords that describe the commands used within a CLI script.

The search for a CLI script that is relevant to a natural language query is performed using a relevancy scoring function that is applied to the different components of the commands used in a CLI script. A command belongs to a command group of a module. The search is initiated from a query in a natural language text string for an intended operation. Keywords or terms are extracted from the query are matched to the description documents of each script. The matching is based on a ranking function that estimates the relevance of the terms in the description documents of a CLI script to the terms in the query. A relevance score is generated for each command, command group and module of each command in a CLI script and weighted. The resulting score for a CLI script is the weighted sum of all relevance scores for each command in the CLI script.

Attention now turns to a further discussion of the system, devices, components, and methods utilized in generating scripts to perform a function on a CLI-based application.

System

Figure 1:
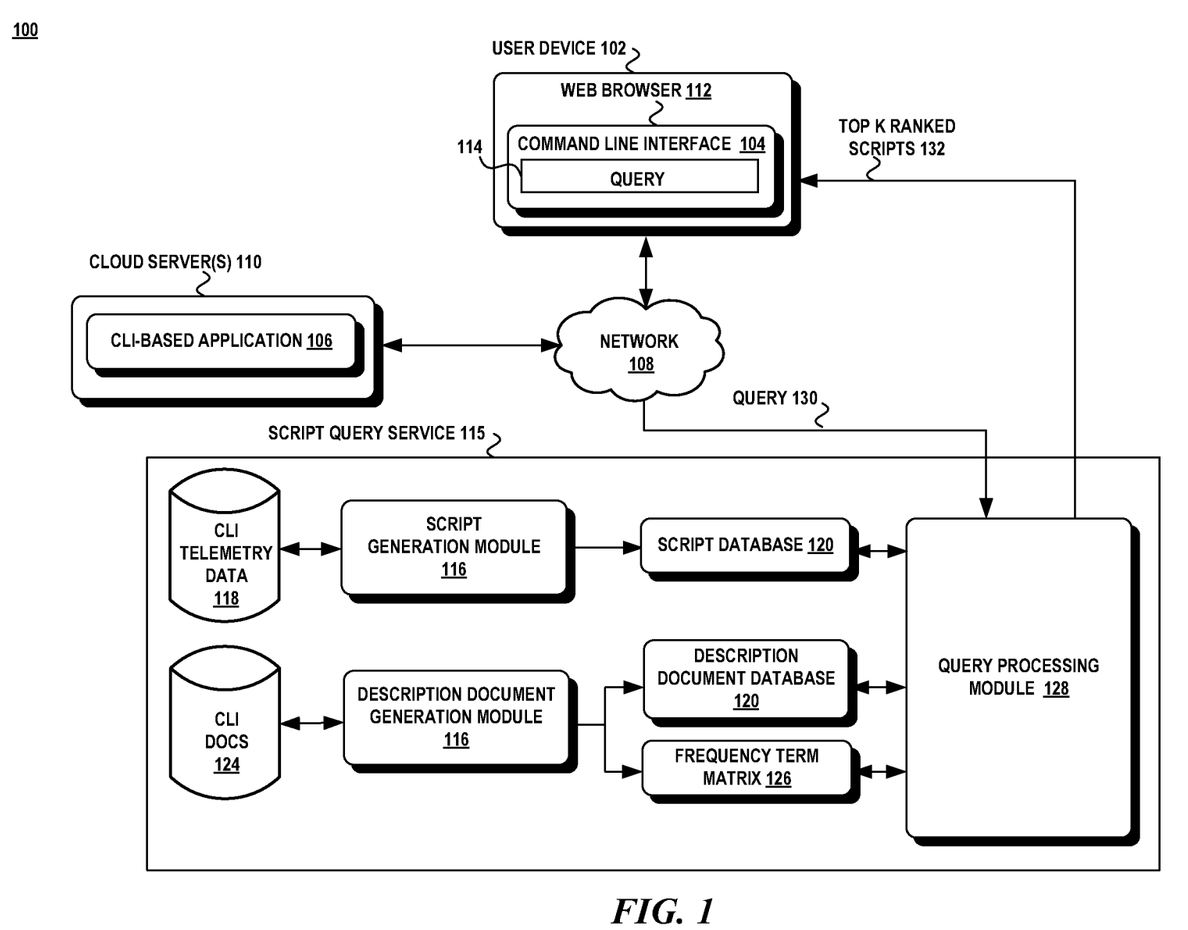
FIG. 1 illustrates an exemplary system for the automatic generation of CLI scripts and for processing natural language requests for a relevant CLI script.

FIG. 1 illustrates an exemplary system 100 in which various aspects of the invention may be practiced. The system 100 includes a user device 102 having a CLI 104 that interacts with a CLI-based application 106 and a script query service 115, all communicatively interconnected through a network 108. The CLI-based application 106 uses CLI commands to perform desired computer operations.

In one aspect, the CLI-based application 106 is part of a computing environment having one or more cloud servers 110. The CLI-based application 106 is a cloud-based application that receives commands initiated from the user device 102. In one aspect, the CLI-based application 106 may be a cloud management and deployment application. The CLI 104 may be a shell program that is executed through a web browser or rich client application 112.

The CLI 104 enables a user (e.g. developer, customer) of the user device 102 to access resources on the cloud server 110 through CLI commands. In one aspect, the CLI commands are entered into a command prompt or input field of the CLI 104 and transformed into Representational State Transfer (REST) Application Programming Interfaces (API) s. The REST APIs are service endpoints that support a set of HTTP operations or methods to create, retrieve, update, delete or access resources on the cloud service.

A user of the user device 102 may use the CLI 104 to make requests for scripts that illustrate how to perform an operation in the CLI-based application. A script contains an ordered sequence of one or more commands CLI commands can vary in complexity depending on their usage and the parameters required to execute the CLI commands Some CLI commands may require one or more input parameters which may be derived from the output of previously-executed commands. The script includes the sequence commands needed to perform an operation in a specific order.

An exemplary CLI is the Azure® command line interface for the Microsoft® Azure® cloud computing service. This cloud computing service provides various services, such as software-as-a-service (Saas), platform-as-a-service (PaaS), and infrastructure-as-a-service (IaaS) to build, test, deploy, and manage services and applications in addition to providing different programming tools. It should be noted that the techniques described herein are not limited to this particular CLI or to a particular configuration of a CLI.

In order to perform an operation in the CLI-based application 106, a user would need to know what sequence of CLI commands to use. The operation may require the execution of a sequence of one or more commands that are executed in a particular order. A script is typically used to execute the operation. The script is a code snippet having the correct sequence of commands that perform an intended operation.

In order to assist the user in knowing the correct script, the user may seek assistance from a script query service 115. The script query service 115 may be part of the CLI-based application 106 or part of a separate cloud-based application or service. The script query service 115 receives natural language queries from users of the CLI-based application 106 for scripts that perform an intended operation.

The script generation service 115 contains a script generation module 116, a description document generation module 116, and a query processing module 128. The script generation module 116 generates scripts derived from CLI telemetry data 118 which are stored in a script database 120. The description document generation module 116 generates description documents of the command components which are stored in the description document database 120. The description document generation module 116 also generates a frequency term matrix 126 that contains the frequency of occurrence of each term in each description document. There is a description document for each module, each command group and each action.

The query processing module 128 receives natural language queries 130 for a script that performs an intended operation. The query processing module 128 searches for the most likely scripts that are relevant to the query. The query processing module 128 ranks the results of the search in a ranked order and returns a threshold number, k, of scripts that are deemed to be the most relevant. Relevance is based on how close the terms in the query match the terms in the description documents associated with a script and the usage frequency of a script in the script generation training dataset.

Methods

Attention now turns to a description of the various exemplary methods that utilize the system and devices disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 2:
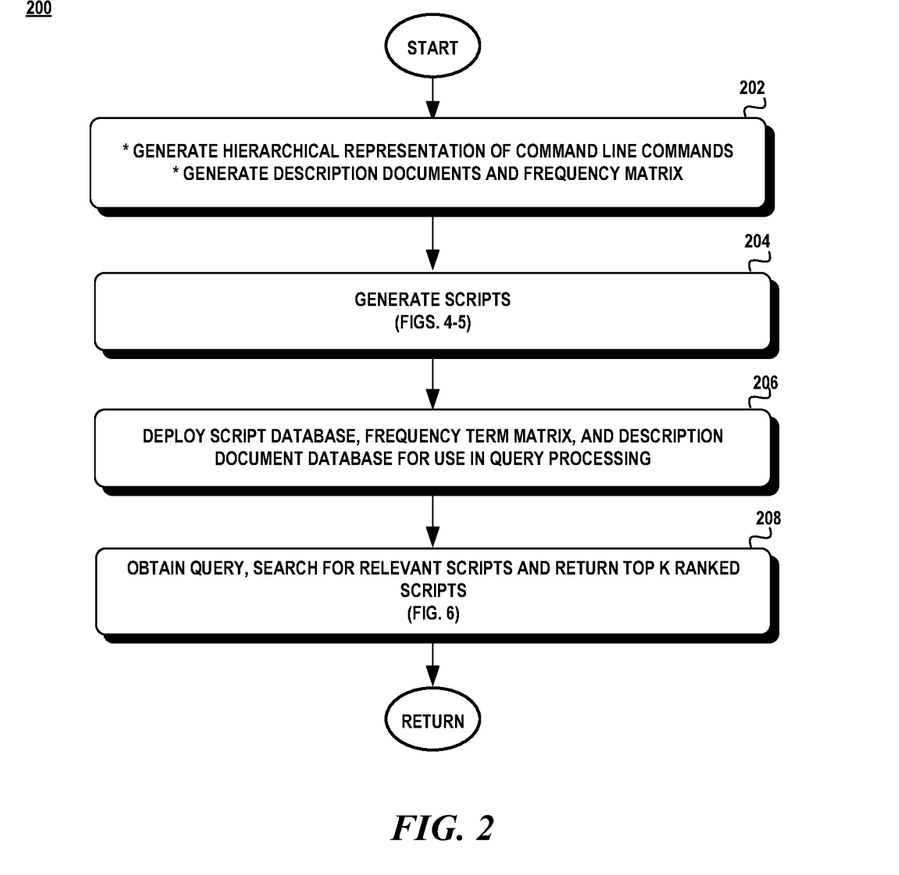
FIG. 2 is a flow diagram illustrating an exemplary method for the automatic generation of CLI scripts and for processing natural language requests for CLI scripts.

Attention now turns to an exemplary method 200 for servicing CLI-based queries. Turning to FIGS. 1 and 2, initially the command structure is represented in a hierarchy of different components (block 202). In one aspect, the command structure is represented as a tree that is composed of modules, command groups, and commands. The tree represents the hierarchical relationship between the components of a module. A module is a service that is supported by the CLI-based application and has commands that perform certain operations in that service. A command group is the group of commands that operate within a module and an action is an act performed on a parent command group. A command is related to a module, a command group and may include an action.

For example, in Azure®, the services include the following: AI+Machine Learning; Analytics; Blockchain; Compute; Containers; Databases; Developer Tools; DevOps; Hybrid; Identity; Integration; Internet Of Things; Management and Governance; Media; Mobile; Networking; Security; Storage; and Web. The AI+Machine Learning service enables a user to run experiments, create and use machine learning nodes, create and deploy log analytics workspace, and create and deploy cognitive services using resources. The Analytics service enables a user to create an event hub to store and analyze events, data or telemetry. The Management and Governance service is used to deploy and manage resources.

The Compute service is used to create, deploy and manage various types of virtual machines and tasks related to running batch jobs. The Networking service creates and manages virtual networks. The Internet of Things service is used to configure IoT Hub message routing, the DevTools service is used obtain CLI samples, how-to-guides, and tutorials, the Database service is used to configure and manage databases, the Storage service is used to create and manage blob storage, and the Security service manages the user accounts, storage accounts, keys, shared tokens, and applications that manage the security mechanisms.

The description document generation module 116 generates description documents describing each of the modules, command groups, and commands that are used in the CLI language. The description documents are stored in a description document database 120. The description documents are generated from the CLI documentation and consists of keywords or terms used to describe the particular module, command group, and command A description document for a particular module, command group, and command is pre-processed to eliminate stop words, translate the words into all lower-case characters, eliminate duplicates, and to utilize lemmas. The description document generation module 116 then generates a frequency term matrix 126 which contains the number of occurrences of each term in each description document. (Collectively, block 202).

Figure 3:
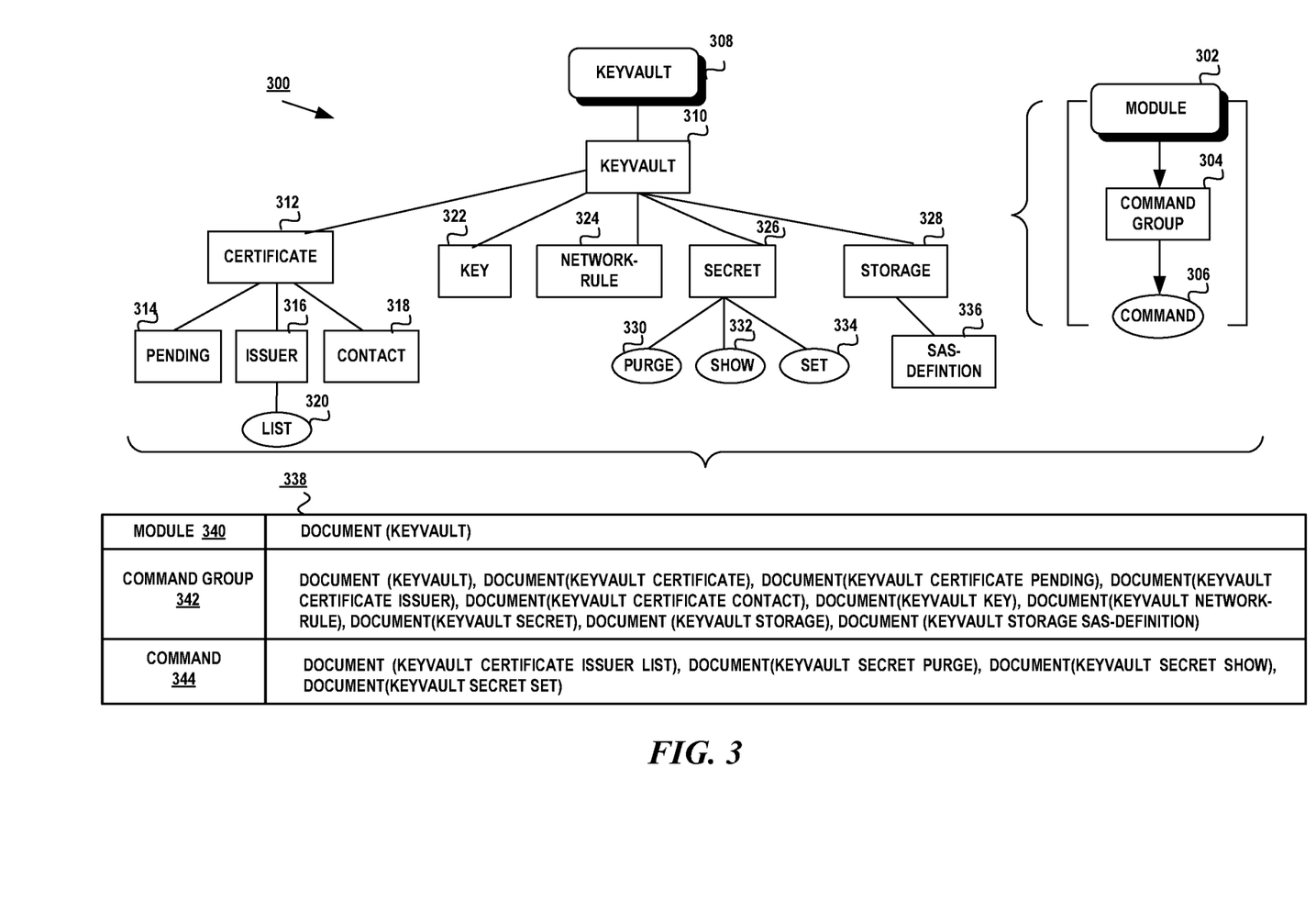
FIG. 3 is an exemplary representation of a hierarchical configuration of the command structure and an exemplary configuration of the description document database.

Turning to FIG. 3, there is shown an exemplary hierarchical representation for a module or service of a CLI-based application. The hierarchy consists of a module 302, a command group 304, and a command 306. The hierarchical representation is a tree that is composed of nodes and edges connecting nodes. The nodes are associated with a module 302, each command of a command group 304 and a command 306. The edges represent a hierarchical relationship between two connected nodes. The module 302 represents a service, the command group 304 is a group of commands and/or sub-commands within the module, and an action is an act performed on its parent command group.

The tree 300 shown in FIG. 3 is for the keyvault service. There is a module node 308 representing the keyvault service, several nodes in the command group representing different commands 310-318, 322-328, 336 that perform operations within the keyvault service, and nodes representing actions 320, 330-334 that are tied to a respective command A description document database 338 is shown which contains description documents for the module 340 (e.g., Document(KeyVault)), each command in the command group 342 (e.g., Document(KeyVault Storage)) and each action 344 (e.g., Document(KeyVault Certificate Issuer List)).

Turning back to FIGS. 1 and 2, the scripts are then generated by the script generation module 116 and stored in the script database 120 (block 204). Upon completion, the description document database 120, the script database 120, and the frequency term matrix 126 are deployed to facilitate processing of the natural language queries (block 206). The query processing module 128 receives a natural language query 130 and searches for relevant scripts (block 208). The top ranked scripts 132 that meet a preconfigured threshold are then returned to the user device 102 (block 208).

Attention now turns to an exemplary method for generating the scripts. A script represents a sequence of commands that were used by others to accomplish a particular task or operation. The scripts are generated from CLI telemetry data captured at the server side of the transaction.

Figure 4:
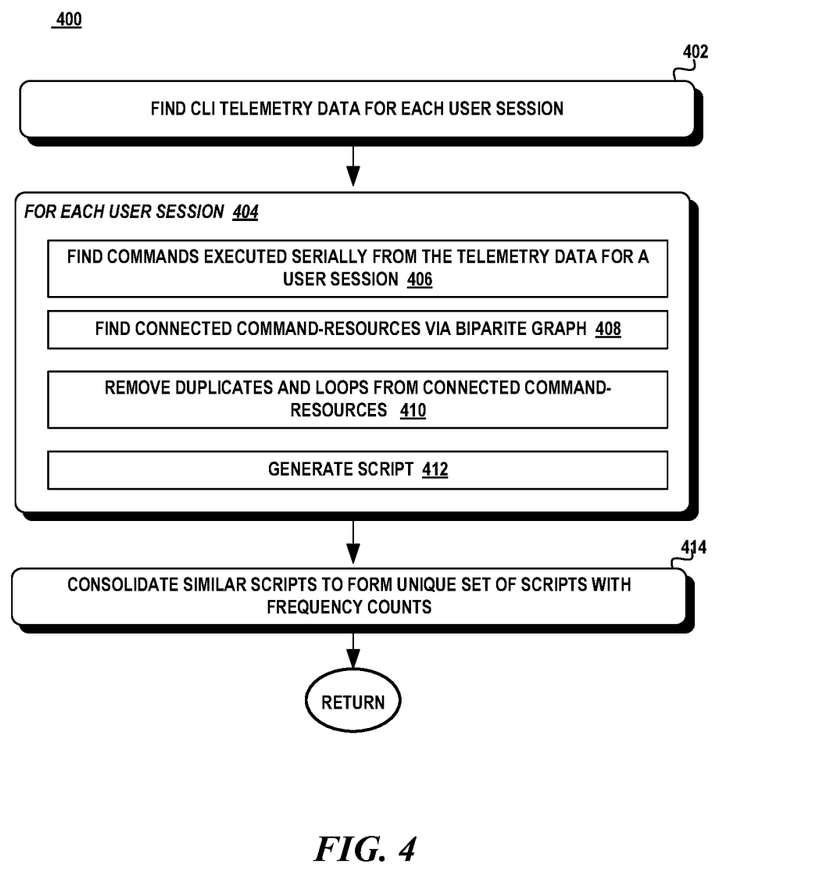
FIG. 4 is a flow diagram illustrating an exemplary method for generating the CLI scripts.
Figure 5:
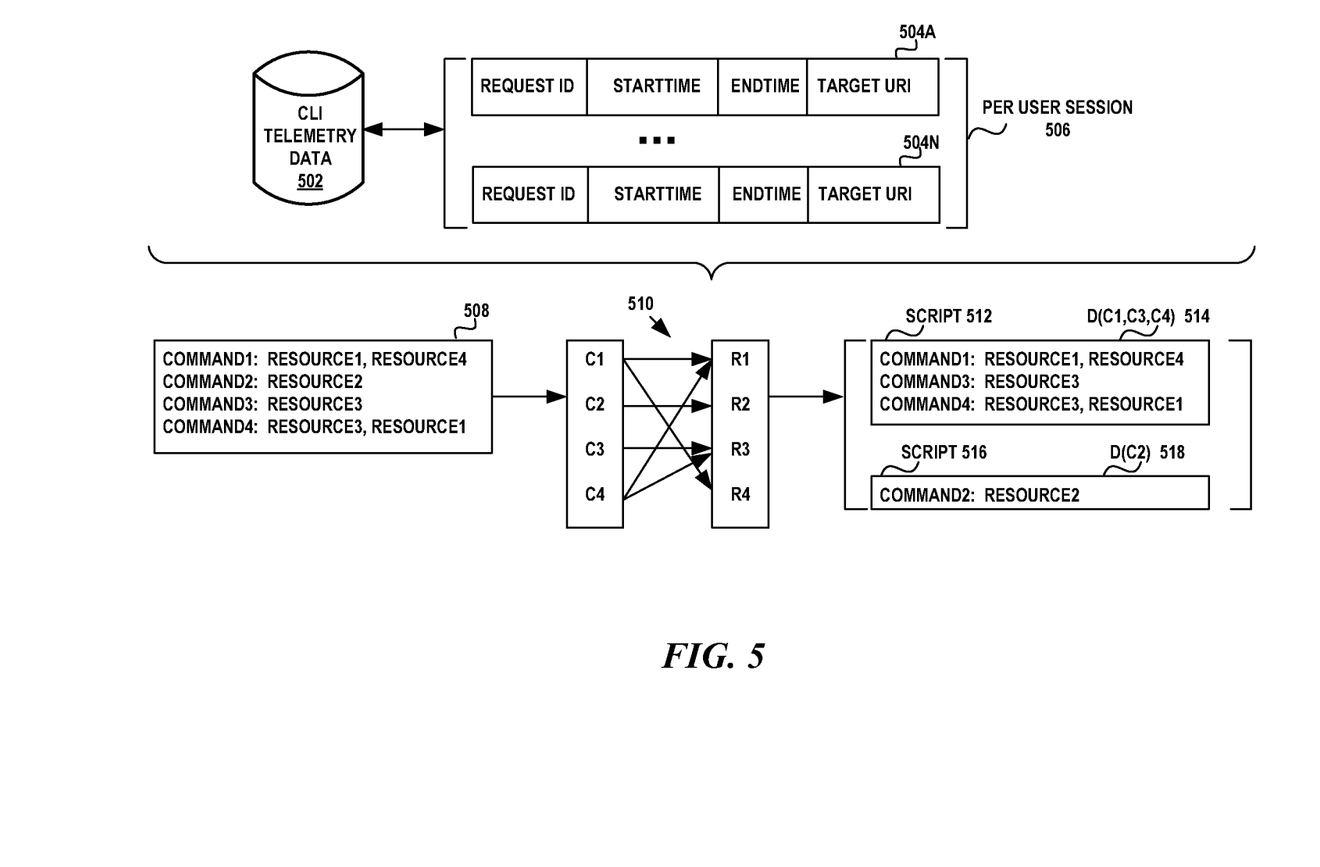
FIG. 5 is an exemplary configuration of the components and processes used in the script generation.

Turning to FIGS. 4 and 5, the CLI telemetry data 502 is used to generate the scripts. The CLI telemetry data 502 is generated from production runs of a CLI-based application. The commands used by a user during a user session with the CLI-based application is monitored and tracked. An event-driven monitoring mechanism generates a line for each command execution that includes a request identifier, a start time, an end time, and a target URI 504A-504N. The request identifier is an obscured and anonymous value that represents a user, the start time that indicates when the command was initiated, the end time represents when a request was ended, and the target URI includes the operation name and the resource or resources that the operation will be executed on.

In order to find the sequence of commands needed to perform an operation, a user session is extracted from the telemetry data. This is not a trivial task since the telemetry data provides no clear indication of the lines of data that relate to a user session. A user session is identified from lines in the telemetry data having a same request identifier within a prescribed time span. The lines of data that relate to a user session may not be consecutive. The telemetry data associated with a user session is then analyzed further. (Collectively, block 402).

For each user session (block 404), the telemetry data is analyzed for sequentially-executed commands (block 406). A user may issue several commands in a row to initiate several different tasks in parallel which do not relate to the same operation. In order to find a sequence of commands issued within the same user session and which relate to a same operation, the time gap between the end time of a command associated with a request identifier and the start time of the following command associated with the request identifier is identified. If the time gap is within a prescribed threshold (e.g. the time gap is negative), the telemetry data of the user session is eliminated. Otherwise, the sequence of commands within the user session 506 are obtained for further analysis. (Collectively, block 406).

The URI in each line of telemetry data is parsed to find the issued commands and the resources the commands are executed on. For example, the following is an exemplary URI:

https://management.azure.com:443/subscriptions/ cd0b2be3-de4e-4dd7-b2b6-5989f32f7bc2/resourceGroups/ cmr-cap-vm-workder-eng-rg/providers/Microsoft.Compute/ virtualMachines/cmrcapet|11/start?api-version=2019-07- 01.

The target URIs usually follow a pattern. For example, one such pattern may be as follows: subscription identifier/ resource group/resource group name/providers/target module or provider name/resource type/resource name. In this pattern, there is a subscription identifier, followed by a resource group, then a resource group name, providers, a target module or provider name, then a resource type and a resource name. This pattern is used to identify the operation and the resource name in a target URI. In case the target URI doesn't adhere to a particular pattern, certain heuristics are in place to extract the relevant information. (Collectively, block 406).

Once each command and associated resource is identified from each URI in a user session 508 (block 406), a bipartite graph 510 is generated to identify the connected command-resources (block 408). A bipartite graph 510 is a graph where the vertices are partitioned into two disjoint and independent sets, such as a command set and a resource set. Every edge connects a vertex in the command set to a vertex in the resource set. Duplicate connections and loops are eliminated so that the bipartite graph 510 shows unique connections between a command and resource (block 410).

From the bipartite graph 510, a script is generated based on commands connected to a common set of resources. In addition, each script has an associated description document that contains the description documents or keywords of each command in the script (Collectively, block 412). This process (blocks 406-412) is repeated for each user session (block 404).

Thereafter, similar scripts from the different user sessions are consolidated to form a unique set of scripts. A script has a frequency count which indicates how often it was used in the training dataset. The scripts are stored in the script database (Collectively, block 414).

As shown in FIG. 5, an exemplary user session 506, has an ordered sequence of four commands 508 that were extracted from the CLI telemetry data 502. The sequence includes command 1 using resources 1 and 4, command 2 using resource 2, command 3 using resource 3 and command 4 using resources 1 and 3. The corresponding bipartite graph 510 shows the connections between each command and resource. From the connected resources, two scripts are generated. Script 512 contains command 1, command 3 and command 4 since these commands are connected through the use of resources 1, 3, and 4. Script 516 contains command 2 since command 2 does not use any resources used by the commands in script 512. Script 512 is associated with description documents, D, for commands 1, 3, and 4, D(C1, C3, C4) 514 and script 516 is associated with the description document, D, for command 2, D(C2) 518.

Figure 6:
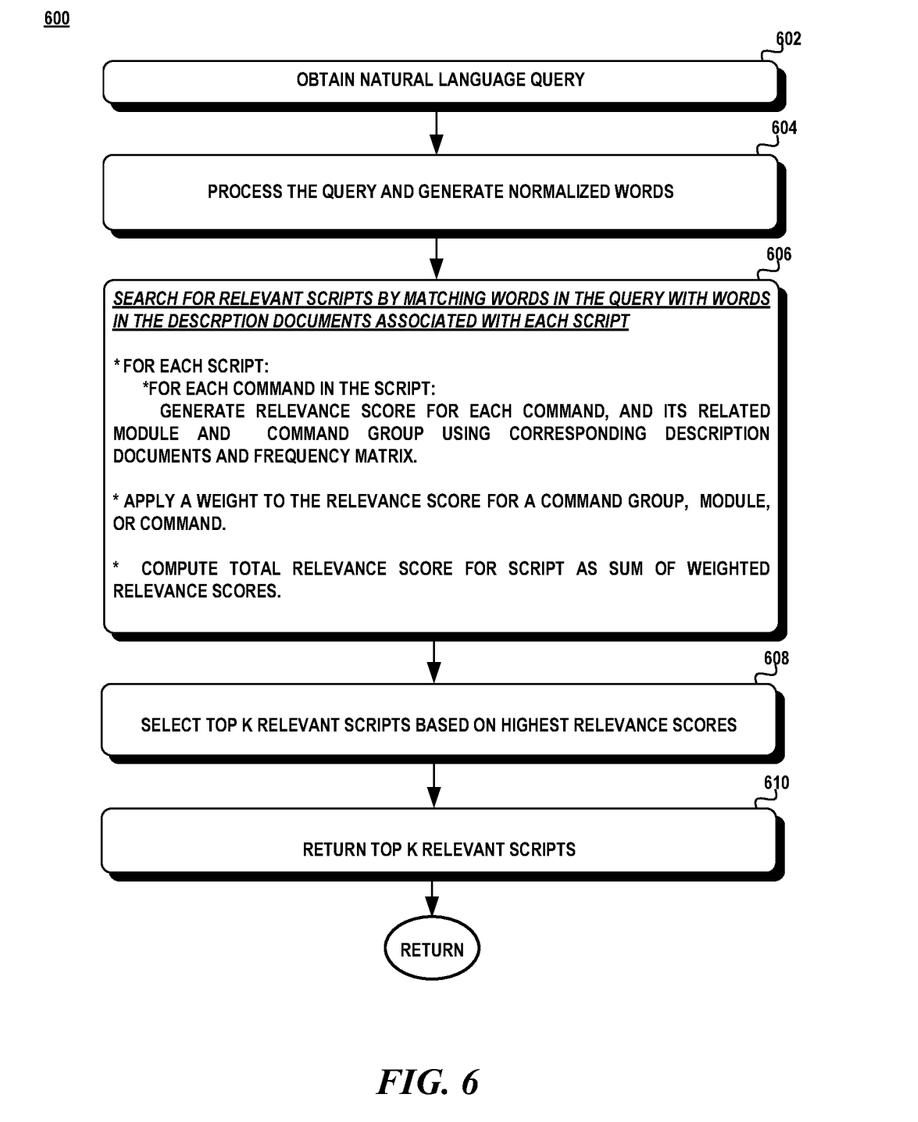
FIG. 6 is a flow diagram illustrating an exemplary method for searching for relevant CLI scripts in response to a natural language request.

Attention now turns to an exemplary process showing the method 600 for searching for a relevant script for a natural language query. Turning to FIGS. 1 and 6, the query processing module 128 receives a natural language query 130 from a user device 102 through the CLI 104 (block 602).

The query processing module 128 processes the query's text string to convert the words in the text string to lower case characters, to remove stop words, and to generate normalized lemmas for similar words. In addition, the query processing module 128 splits composite words, resolves Out of Vocabulary (OOV) words, and performs query expansion. Composite words are split into their component words using frequent n-grams derived from the associated documentation. OOV resolution accounts for the possibility that a user misspelled a word or uses a word outside of the vocabulary. The word is resolved by finding the closest word in the vocabulary with the highest cosine similarity of the embeddings of resolved words. (Collectively, block 604).

In query expansion, words are added to the query whose embeddings are close to the words in the query. This gives the model more relevant terms to match the query to the correct code snippet. For example, if the query is create vm, the query may be expanded to create virtual machine if the words virtual and machine have a high cosine similarity to words in the query. (Collectively, block 604).

The words in the query's text string are then matched with the words in each description document associated with a script to find relevant scripts (block 606). The matching is performed through a probabilistic interpretation where a mathematical function is used to estimate the likelihood that a script is relevant to a query. The search relies on the probability ranking principle which states that if a reference retrieval system's response to each request is a ranking of the documents in the collection in order of decreasing probability of relevance to the user who submitted the request, where the probabilities are estimated as accurately as possible on the basis of whatever data have been made available to the system for this purpose, the overall effectiveness of the system to its user will be the best that is obtainable on the basis of those data. Hence, the search requires that all scripts are analyzed in order to rank the results in decreasing probability of relevance.

In one aspect, the probabilistic ranking is achieved through a relevance score such as Best Match 25 or BM25. BM25 is a term-weighting document-scoring function that is represented mathematically as follows:

$$\text{score}(D, Q) = \sum_{i=1}^{n} IDF(Q_i) * \frac{f(q_i, D) * (k_1 + 1)}{f(q_i, D) + k_1 * \left((1-b) + \frac{b*|D|}{avgdl}\right)},$$

$$\text{where } IDF(q_i) = \frac{\log N - n(q_i) + 0.5}{n(q_i) + 0.5},$$

where Q represents a query having keywords, $q_1, \ldots q_n$, D is a document, |D| is the length of the document, avgl is the average length of the documents in the description document database, $k_1$ and b are user-defined parameters, $IDF(q_i)$ is the inverse document frequency weight of the term $q_i$, N is the total number of documents in the description database, and $n(q_i)$ is the number of documents containing the term $q_i$ which is found in the frequency matrix.

The Inverse Document Frequency (IDF) function measures how important a word is by weighing each term by its use in all the documents and by penalizing terms that are common. The term frequency $f(q_i, D)$ measures how frequently a term, $q_i$, occurs in a document, D. The more often the term appears, the better the score. Since documents are of different lengths, the term frequency is expressed in terms of the length of document D. The parameter b is a tuning parameter that determines the scaling by document length. The parameter k1 is another tuning parameter which helps determine term frequency saturation characteristics which is how much a single query term can affect the score of a given document.

The relevance score is computed for each command in a script, the command group of each command in a script, and the module of each command in a script. The relevance score is computed based on the keywords in the query and the keywords in each description document for the command, command group, and module of a script.

For example, turning to FIG. 5, the BM25 score for script 512 consists of the following: BM25 score for command1, BM25 score for the command group of command1, BM25 score for the module of command1, BM25 score for command3, BM25 score for the command group of command3, the BM25 score for the module of command3, BM25 score for command4, BM25 score for command group of command4, BM25 score for the module of command4.

A weight is applied to one or more of the command components. For example, a weight may be applied to the module score, the command group score, and/or the command score. In some situations, a weight may be applied to the module score to increase the significance of the module and another weight to the command score in order to decrease the significance of the action in the command. The weighted BM25 scores are added and the sum is the total relevance score for the script. (block 606)

The total relevance score for each script is then ranked in descending order (block 608) and the top k relevant scripts are returned, where k is a pre-configured value (block 610).

Exemplary Operating Environment

Figure 7:
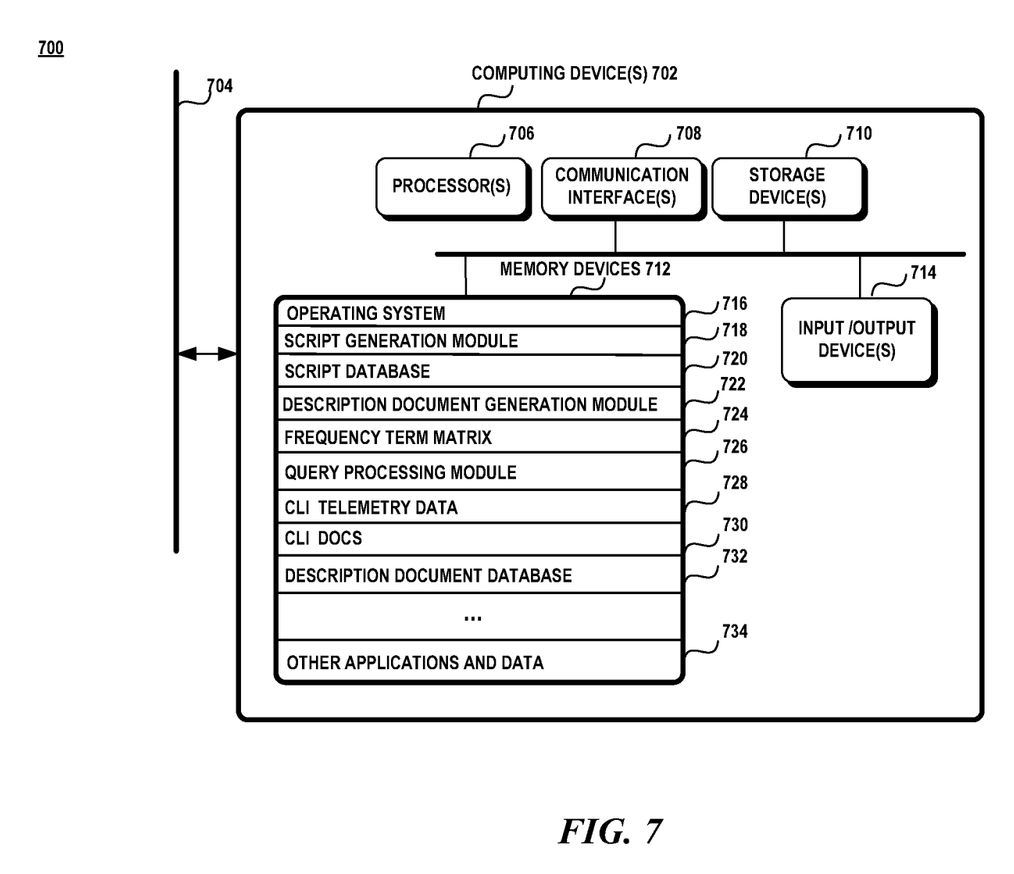
FIG. 7 is a block diagram illustrating an exemplary operating environment.

Attention now turns to a discussion of an exemplary operating environment. FIG. 7 illustrates an exemplary operating environment 700 used to generate examples for command-line commands. The operating environment 700 may be configured as a cloud service having multiple computing devices or configured as a single computing device. The computing devices 702 are coupled to a network 704 to other computing devices. However, it should be noted that the aspects disclosed herein is not constrained to any particular configuration of devices and that other configurations are possible.

A computing device 702 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, an Internet-of-Things (IOT) device, a distributed computing system, multiprocessor systems, or combination thereof. The operating environment 700 may be configured in a network environment, a distributed environment, a multi-processor environment, or a stand-alone computing device having access to remote or local storage devices.

A computing device 702 may include one or more processors 706, one or more communication interfaces 708, one or more storage devices 710, one or more input/output devices 714 and one or more memory devices 712. A processor 706 may be any commercially available or customized processor and may include dual microprocessors and multi-processor architectures. A communication interface 708 facilitates wired or wireless communications between the computing devices and other devices.

A storage device 710 may be computer-readable medium that does not contain propagating signals, such as modulated data signals transmitted through a carrier wave. Examples of a storage device 710 may include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices in a computing device. The input/output devices 714 may include a keyboard, mouse, pen, voice input device, touch input device, display, speakers, printers, etc., and any combination thereof.

A memory device 712 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 712 may also include one or more external storage devices or remotely located storage devices that do not pertain to propagated signals, such as modulated data signals transmitted through a carrier wave.

Memory devices 712 may include an operating system 716, a script generation module 718, a script database 720, a description document generation module 722, a frequency term matrix 724, a query processing module 726, CLI telemetry data 728, CLI docs 730, and other application and data 732.

Network 704 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

A network 704 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of automatically generating CLI scripts that execute a sequence of commands to perform an operation specified in a natural language query. The generated CLI scripts are then used to respond to a query for a script that is relevant to a requested operation. The technical features associated with addressing this problem involves generating CLI scripts from telemetry data and to create a set of keywords descriptors for the commands used within each CLI script. The search for relevant CLI scripts uses a relevance score that estimates the relevance of a script to the requested operation using the set of keyword descriptors of each CLI script and the terms in the natural language query.

Conclusion

A system is disclosed having one or more processors coupled to a memory and one or more programs stored in the memory. The one or more programs are configured to be executed by the one or more processors. The one or more programs including instructions that: provide command-line interface (CLI) scripts, a CLI script having one or more commands that when executed perform an operation in a CLI-based application, a CLI script associated with a description document that contains keywords for each command in the CLI script; receive a natural language query; find one or more CLI scripts relevant to the natural language query through generation of a relevance score for each CLI script, the relevance score based on an estimation of terms in the natural language query matching keywords in the description document of each CLI script; and return a select number of CLI scripts having a highest relevance score.

In an aspect, the one or more programs include further instructions that: partition the commands of a CLI into multiple components; and derive a relevance score for each component of a command in the CLI script. In one aspect, the one or more programs include further instructions that: apply a weight to the relevance score of at least one component; and compute the relevance score for a CLI script as a weighted sum of relevance scores of each component of each command within a CLI script. In an aspect, the relevance score is based on a term-weighting and document-scoring function. In one aspect, the relevance score is based on a Best Match 25 score.

In additional aspects, the one or more programs include further instructions that: obtain telemetry data from multiple user sessions; determine a portion of the telemetry data pertaining to a first user session; and aggregate commands in the portion of the telemetry data using similar resources into a CLI script. In an aspect, the one or more programs include further instructions that: generate the keywords of the description document from documentation of the CLI.

A method is disclosed comprising: providing a plurality of command-line interface (CLI) scripts, a CLI script having an ordered sequence of one or more commands, a command associated with one or more related components; searching for a command-line interface (CLI) script relevant to a query by calculating a relevance score for each CLI script, the relevance score for a CLI script including a relevance score for each command in the CLI script; and selecting one or more CLI scripts having a highest relevance score.

In an aspect, the method further comprises: calculating the relevance score for a CLI script as a sum of a plurality of relevance scores, the plurality of relevance scores including a relevance score of the command and relevance scores of the related components of the command, wherein a relevance score is based on a frequency of occurrence of keywords in the query in description documents pertaining to the command and the related components of the command. In some aspects, the relevance score of the CLI script is based on a frequency of occurrence of the CLI script derived from a training dataset used to generate the plurality of CLI scripts.

In an aspect, the method further comprises applying a weight to one or more of the plurality of relevance scores. In some aspects, the relevance score is based on a Best Matching 25 function. In one or more aspects, the method further comprises obtaining telemetry data from production runs of a CLI-based application; extracting a sequence of commands initiated during a user session from the telemetry data; and generating a CLI script from the extracted sequence of commands. In an aspect, the method further comprises aggregating CLI scripts within similar commands into a unique CLI script; and associating a frequency count with the unique CLI script representing a number of aggregated CLI scripts. In other aspects, the method further comprises associating a description document for each command in the generated CLI script.

A device is discloses having at least one processor and memory. The at least one processor is configured to: receive a query for a command-line interface (CLI) script to perform an operation on a CLI-based application; obtain a plurality of CLI scripts, a CLI script having an ordered sequence of one or more commands, a command associated with one or more related components of a command structure of the CLI-based application, a CLI script associated with a set of keywords for each command in the CLI script; generate a relevance score for each CLI script, the relevance score estimating a relevance of the CLI script for the query, the relevance score based on a frequency of occurrence of keywords in the query with the set of keywords of each command in the CLI script; and select one or more CLI scripts having a highest relevance score.

In an aspect, the relevance score for each CLI script is a sum of relevance scores of each command in a CLI script. In one aspect, the relevance score for each command in a CLI script includes a relevance score for each related component of the command. In some aspects, the at least one processor is further configured to: generate a CLI script from the plurality of scripts from a sequence of commands issued within a user session, wherein the sequence of commands operate on a common set of resources. In an aspect, the relevance score is based on a term-weighting and document scoring function.

In the description above, specific details of various aspect are provided. However, some aspects may be practiced with less than all of the specific details and in other aspects, certain methods, procedures, components, structures, devices, processes and/or functions are described in no more detail than to enable the various aspects of the invention for the sake of brevity and clarity.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
one or more processors coupled to a memory; and
one or more programs, wherein the one or more programs are stored in the memory and configured to be executed by the one or more processors, the one or more programs including instructions to perform acts that:
provide command-line interface (CLI) scripts, a CLI script having one or more commands that when executed perform an operation in a CLI-based application, a CLI script associated with a description document that contains keywords for each command in the CLI script;
receive a natural language query;
find one or more CLI scripts relevant to the natural language query through generation of a relevance score for each CLI script, the relevance score based on an estimation of terms in the natural language query matching keywords in the description document of each CLI script; and
return a select number of CLI scripts having a highest relevance score.

2. The system of claim 1, wherein the one or more programs include further instructions to perform acts that:
partition the commands of a CLI into multiple components; and
derive a relevance score for each component of a command in the CLI script.

3. The system of claim 2, wherein the one or more programs include further instructions to perform acts that:
apply a weight to the relevance score of at least one component; and
compute the relevance score for the CLI script as a weighted sum of relevance scores of each component of each command within the CLI script.

4. The system of claim 1, wherein the relevance score is based on a term-weighting and document-scoring function.

5. The system of claim 1, wherein the relevance score is based on a Best Match 25 score.

6. The system of claim 1, wherein the one or more programs include further instructions to perform acts that:
obtain telemetry data from multiple user sessions;
determine a portion of the telemetry data pertaining to a first user session; and
aggregate commands in the portion of the telemetry data using similar resources into a CLI script.

7. The system of claim 1, wherein the one or more programs include further instructions to perform acts that:
generate the keywords of the description document from documentation of the CLI.

8. A method, comprising:
providing a plurality of command-line interface (CLI) scripts, a CLI script having an ordered sequence of one or more commands, a command associated with one or more related components;
searching for a command-line interface (CLI) script relevant to a query by calculating a relevance score for each CLI script, the relevance score for a CLI script including a relevance score for each command in the CLI script; and selecting one or more CLI scripts having a highest relevance score.

9. The method of claim 8, further comprising:

calculating the relevance score for a CLI script as a sum of a plurality of relevance scores, the plurality of relevance scores including a relevance score of the command and relevance scores of the related components of the command, wherein a relevance score is based on a frequency of occurrence of keywords in the query in description documents pertaining to the command and the related components of the command.

10. The method of claim 9, wherein the relevance score of the CLI script is based on a frequency of occurrence of the CLI script derived from a training dataset used to generate the plurality of CLI scripts.

11. The method of claim 9, further comprising:

applying a weight to one or more of the plurality of relevance scores.

12. The method of claim 8, wherein the relevance score is based on a Best Match 25 function.

13. The method of claim 9, further comprising:

obtaining telemetry data from production runs of a CLI-based application;

extracting a sequence of commands initiated during a user session from the telemetry data; and generating a CLI script from the extracted sequence of commands.

14. The method of claim 13, further comprising:

aggregating CLI scripts within similar commands into a unique CLI script; and associating a frequency count with the unique CLI script representing a number of aggregated CLI scripts.

15. The method of claim 13, further comprising:

associating a description document for each command in the generated CLI script.

16. A device, comprising:

at least one processor and memory;

wherein the at least one processor is configured to to perform acts that:

receive a query for a command-line interface (CLI) script to perform an operation on a CLI-based application;

obtain a plurality of CLI scripts, a CLI script having an ordered sequence of one or more commands, a command associated with one or more related components of a command structure of the CLI-based application, a CLI script associated with a set of keywords for each command in the CLI script;

generate a relevance score for each CLI script, the relevance score estimating a relevance of the CLI script for the query, the relevance score based on a frequency of occurrence of keywords in the query with the set of keywords of each command in the CLI script; and select one or more CLI scripts having a highest relevance score.

17. The device of claim 16, wherein the relevance score for each CLI script is a sum of relevance scores of each command in a CLI script.

18. The device of claim 17, wherein the relevance score for each command in a CLI script includes a relevance score for each related component of the command.

19. The device of claim 16, wherein the at least one processor is further configured to perform acts that:

generate a CLI script from the plurality of scripts from a sequence of commands issued within a user session, wherein the sequence of commands operate on a common set of resources.

20. The device of claim 16, wherein the relevance score is based on a term-weighting and document scoring function.

* * * * *